United States Patent [19]
Weber et al.

[11] Patent Number: 5,411,437
[45] Date of Patent: May 2, 1995

[54] MEDICAL TRAINING AID

[75] Inventors: Alice H. Weber, Toledo, Ohio; Katherine L. Miller, Cambridge City, Ind.

[73] Assignee: Legacy Products, Inc., Toledo, Ohio

[21] Appl. No.: 122,155

[22] Filed: Sep. 17, 1993

[51] Int. Cl.6 .......................................... G09B 23/28
[52] U.S. Cl. ................................... 434/269; 434/272; 434/267
[58] Field of Search ............... 434/268, 269, 262, 267, 434/270, 272, 86, 94, 99, 100, 132, 147, 236; 446/296, 321, 372, 385, 369

[56] References Cited

U.S. PATENT DOCUMENTS

| 4,591,521 | 5/1986 | Freno et al. | 446/372 |
| 4,639,235 | 1/1987 | Ibe | 446/392 |
| 4,710,145 | 12/1987 | Hall Vandis | 434/267 |
| 4,726,772 | 2/1988 | Amplatz | 434/272 |
| 4,776,823 | 10/1988 | Hanlon | 446/321 |
| 4,822,285 | 4/1989 | Summerville | 434/272 |
| 4,944,681 | 7/1990 | Burgio et al. | 434/267 |
| 5,314,339 | 5/1994 | Aponte | 434/262 |
| 5,356,295 | 10/1994 | Grosz | 434/272 |

FOREIGN PATENT DOCUMENTS 2013508 8/1979 United Kingdom ............... 446/321

Primary Examiner—Cary E. O'Connor
Attorney, Agent, or Firm—Donald R. Fraser

[57] ABSTRACT

A medical training aid having at least one portion thereof covered with a fastener-accepting fabric. Overlays or organ models having fasteners are provided for attachment to the training aid for teaching purposes. The overlays or organ models may cooperate with internal or external injection sites.

23 Claims, 5 Drawing Sheets

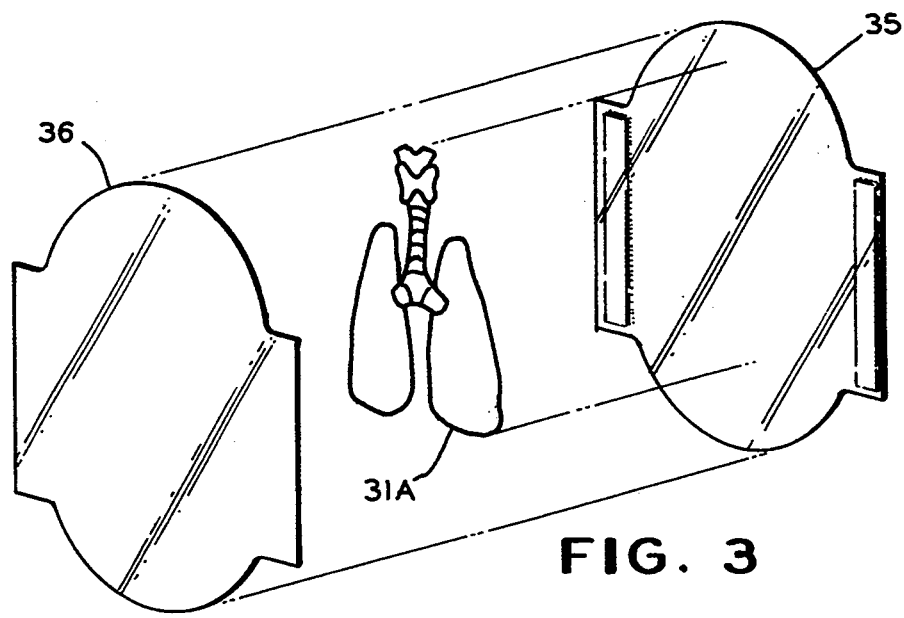
FIG. 3
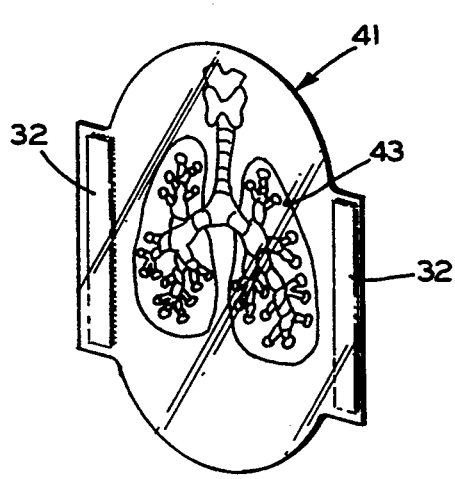
FIG. 4
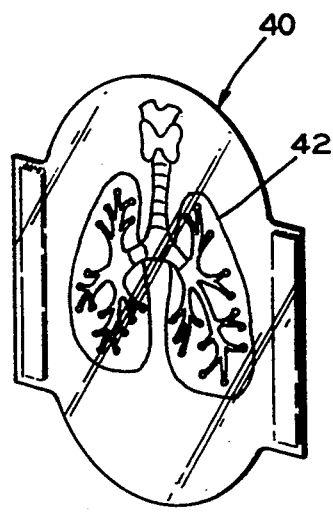
FIG. 5
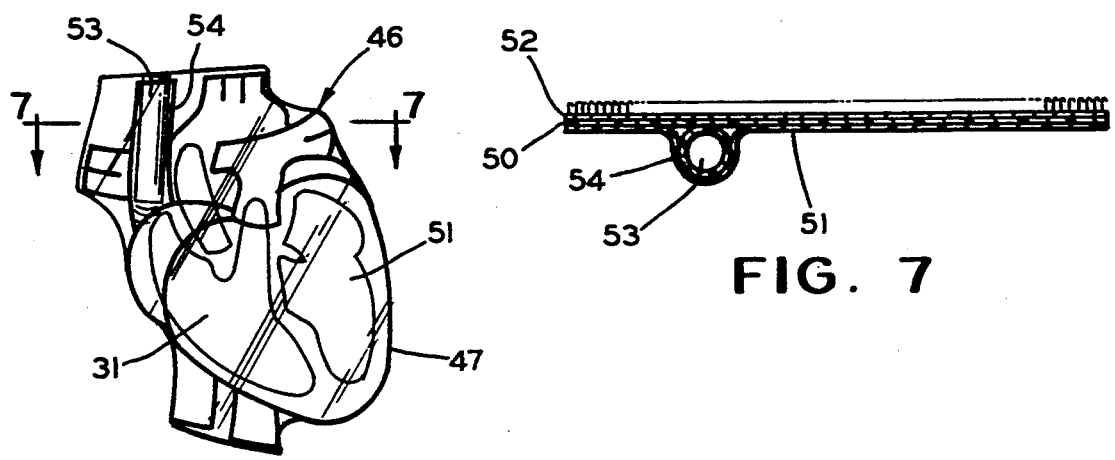
FIG. 6
FIG. 7

MEDICAL TRAINING AID

BACKGROUND OF THE INVENTION

1. Field of the Invention

The present invention relates to medical training aids. More particularly, the present invention relates to medical training aids of the type wherein transparencies or models or representations of body organs may easily be attached and removed therefrom. Most particularly, the present invention relates to a medical training doll having a fastener accepting surface which allows interchangeable medical transparencies, "second skins", or organ models to be easily removed and attached thereto for teaching about various physical conditions. The transparencies "second skins", or organ models may be used in conjunction with medical implement accepting and/or injection sites, and/or internal tubing or reservoirs used within the doll.

2. Description of the Prior Art

When an adult faces surgery, the surgeon with the use of charts, for example, can explain the nature of the condition of the patient and the corrective surgery. Anxiety is relieved to the extent possible.

However, when the patient is a child, the situation is different. The hospital is often an unknown and fearful place for a child. The child does not understand what is about to happen. In many cases, the child is too young to understand the type of charts a doctor would use to explain a condition to an adult. Thus, those skilled in the art have searched for an easily usable and easily understood way to explain to children what is wrong, and what is going to be done.

One solution is to provide a life-like model of various portions of the body which can be opened to reveal the organs in question. However, these tend to be rather large, bulky and expensive.

Another solution used to aid in explaining and enabling children to learn about their medical conditions is a soft sculpture doll made with various applique and embroidery. The doll, with the aid of Velcro ® "type" fasteners, opens and closes to reveal internal systems and organs enabling children to learn about their own medical conditions. Since the various flaps are permanently attached, there is no opportunity to show the changes taking place in any particular organ. This limits the usefulness of this type of doll. Thus, those skilled in the art continued to search for the solution of how to provide a practical teaching aid.

SUMMARY OF THE INVENTION

In order to solve the problem longstanding in the art of providing a versatile training aid, a medical training doll having at least a soft body torso partially covered with a fastener accepting fabric, is provided. Transparencies or organs may be easily attached and removed therefrom to explain medical conditions, and for other training purposes.

In one embodiment of the present invention, the torso is covered with a loop type fabric which will accept a hook-type fastener. Organ models are attachable to the body. The organ models may be attached and used in conjunction with injection sites, where desired. Many medical conditions are easily illustrated with this embodiment of the invention.

In another embodiment of the present invention, a transparent vest attachment having fasteners can be used in conjunction with an organ model. The organ model is attached to the medical training doll in the appropriate position. The organ model has a medical implement accepting and/or injection site associated therewith. The transparent vest is attached over the injection site. Injections can then be made through the vest into the injection site. Training associated with injections, such as cleaning the injection area before and after the injection with the actual chemicals used can then be performed without discoloring the soft body fabric of the doll.

In a further embodiment of the present invention, a "second skin" attachment having fasteners can be used with organ models, implanted ports, and other devices. The "second skin" is an opaque attachment having a surface of fabric accepting fabric similar or identical to the fastener accepting fabric on the medical training doll. The "second skin" is attached over an organ model and/or an injection and/or medical implement accepting site for teaching young children how an implanted port or other device may feel after surgery. An injection can then be made through the "second skin".

In yet another embodiment of the present invention, injection sites are associated with internal tubes and lines. A transparent vest having fastening means can be attached over the internal injection site, and training conducted as above.

In a still further embodiment of the present invention, medical transparencies having pictures, design, text or other indicia or training aids thereon are provided for easy attachment to the torso of the medical training doll.

In another embodiment of the invention, the medical transparencies are provided in sets. The first transparency of each set incorporates a picture of a healthy organ thereon. The second and/or subsequent transparencies contain pictures showing the progress of a specific disease regarding that organ illustrated therein for teaching purposes. A set may consist of as few as two transparencies, or as many transparencies as are needed. The progress of organ related diseases is easily illustrated with this embodiment of the invention.

Thus, it is an object of the present invention to provide a medical training doll for use in explaining surgery to pediatric patients.

It is a further object of the present invention to provide a medical training doll to which a series of transparencies representing the progression of an illness may easily be attached and removed.

It is a still further object of the present invention to provide a medical training doll to which organs having injection sites may be easily attached and removed.

It is a still further object of the present invention to provide a transparent vest overlay in connection with a medical training doll of the foregoing nature which may be used with internal or external injection sites.

Further objects and advantages of this invention will be apparent from the following description and appended claims, reference being made to the accompanying drawings forming a part of the specification, wherein like reference characters designate corresponding parts in the several views.

BRIEF DESCRIPTION OF THE DRAWINGS

FIG. 3 is a modification of the overlay construction shown in FIG. 2.

FIG. 4 is a perspective view of an overlay showing an asthma-diseased lung.

FIG. 5 is an overlay construction similar to FIG. 4, showing a healthy lung.

FIG. 6 is an elevational view of an organ model embodying the present invention.

FIG. 7 is a sectional view, taken in the direction of the arrows, along the section line 7—7, shown in FIG. 6.

It is to be understood that the present invention is not limited in its application to the details of construction and arrangement of parts illustrated in the accompanying drawings, since the invention is capable of other embodiments, and of being practiced or carried out in various ways within the scope of the appended claims. Also, it is to be understood that the phraseology and terminology employed herein is for the purpose of description, and not of limitation.

DESCRIPTION OF THE PREFERRED EMBODIMENTS

Figure 1:
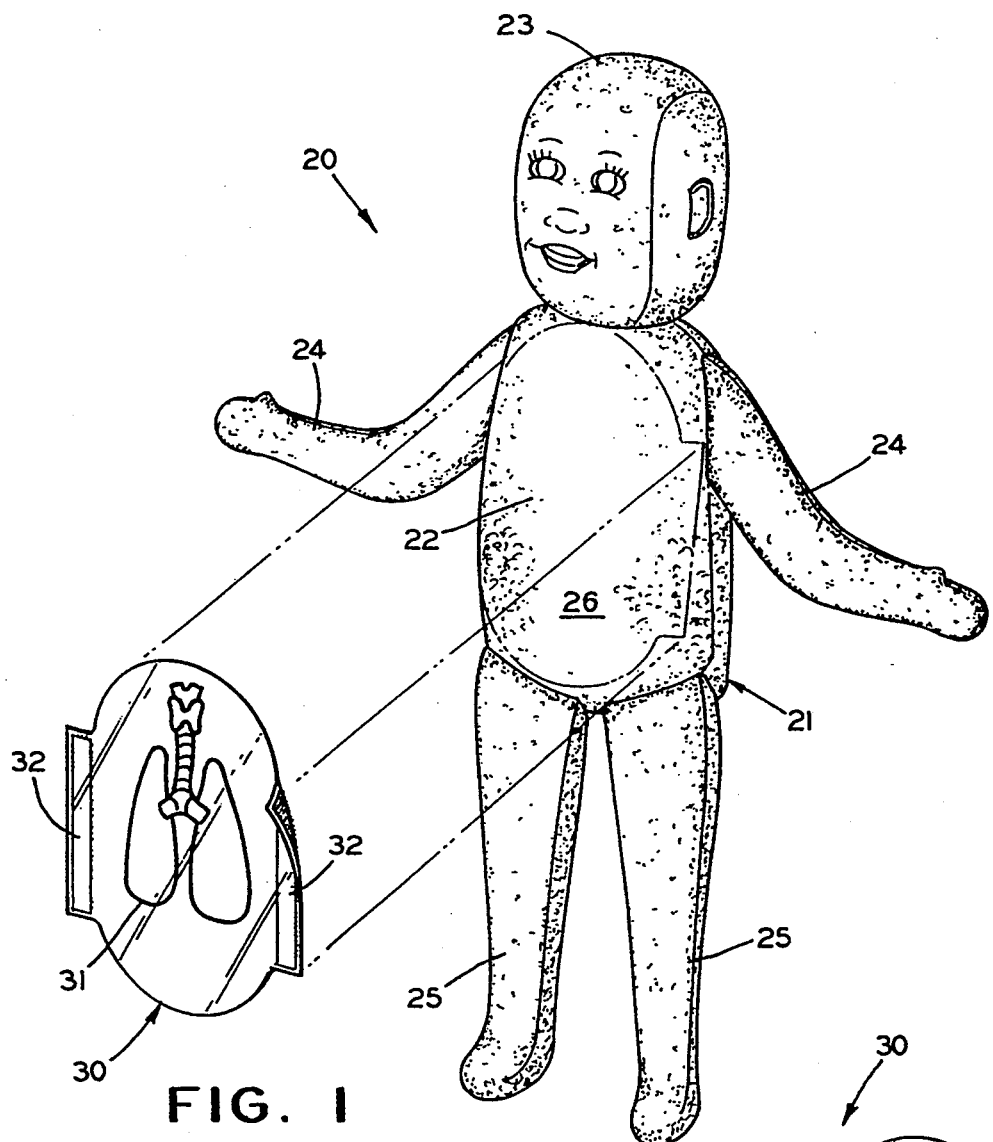
FIG. 1 is a exploded perspective view showing a construction embodying the present invention.

Referring to FIG. 1, there is shown a medical training aid embodying the construction of the present invention, generally designated by the numeral 20. The medical training aid may take the form of a medical training doll 21 having a torso 22, a head 23, arms 24, and legs 25. The medical training doll 21 is of a soft bodied construction well known in the art, and is covered with what is broadly referred to as a fastener accepting fabric 26.

The fastener accepting fabric 26 in the illustrated embodiment of the invention covers the entire body of the medical training doll 21. It is well within the scope of the present invention that the fastener accepting fabric 26 cover less than all of the doll 21. It is preferred that at least the torso 22 of the doll 21 be covered by the fastener accepting fabric 26 because the torso 22 is the portion of the doll 21 which is used most for training purposes.

The particular fastener accepting fabric 26 to be used will depend on the fastening means used with the present invention. For example, in the event snap fasteners are used to fasten items to the doll 21, a heavy fabric capable of accepting fasteners and holding them through repeated uses without tearing may be used. In the preferred embodiment of the invention, a loop type fabric known by the trade name "Velvet Loop" and manufactured by Guilford Mills of Greensboro, North Carolina, is used. The hook and loop type fabric is commonly used to hold Velcro ® fasteners. For ease of illustration, the remainder of the present invention will be described using hook-type (male) fasteners which engage a loop-type (female) fastener accepting fabric.

In the embodiment of the invention shown in FIG. 1, a transparent overlay 30, having indicia 31 thereon, is connected by fasteners 32 to the fastener accepting fabric 26 covering the doll 21.

Figure 2:
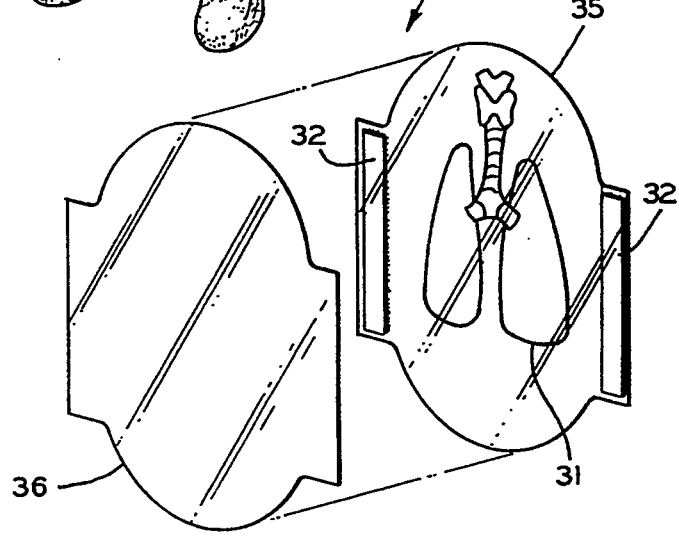
FIG. 2 is an exploded perspective view of the overlay shown in FIG. 1.

Referring to FIGS. 2 and 3, the construction of the overlay 30 may be of two different types.

Referring specifically to FIG. 2, the overlay 30 consists of a first sheet 35 of a suitable transparent material, which may be a vinyl polymer, or the like, depending upon the particular use intended for the medical training aid 20. The indicia 31 is drawn, printed or painted directly on a surface of first sheet 35. A second sheet 36 of a suitable material is then joined to first sheet 35, over indicia 31, by any suitable means.

In the preferred embodiment of the invention, the second sheet 36 is heat-fused to the first sheet 35 to prevent any possibility of cleaning chemicals or other chemicals used in training from reaching and discoloring the indicia 31. It has been known to stitch the first sheet 35 to the second sheet 36, but for the aforementioned reasons, has not resulted in a durable construction. A pair of separable fasteners 32 are attached by any suitable means to the first sheet 35 to attach the overlay 30 to the doll 21. A self-stick Velcro ® fastener has proven satisfactory.

Referring specifically to FIG. 3, there is shown first sheet 35, and second sheet 36, which may be identical to those shown in FIG. 2. In this case, the indicia 31A is provided as a separate two or three dimensional object which is laminated between first sheet 35 and second sheet 36 by any suitable means. If the indicia 31A is a two dimensional object, it is preferred that it be heat-fused between first sheet 35 and second sheet 36. If a three dimensional object is used, a heat shrinkable film may also be used.

Referring to FIGS. 4 and 5, a particularly useful feature of the present invention is shown. Sets of overlays are provided for teaching purposes which show the progression of a disease from a healthy organ to that of a diseased organ.

A set of teaching aids or overlays 30 consist of a first overlay 40 and a second overlay 41 which may be constructed in accordance with either FIG. 2 or FIG. 3. A healthy lung or indicia 42 is shown on first overlay 40. In explaining potential surgery to a child or other patient, the first overlay 40 would be attached to the medical training doll 21 as shown in FIG. 1. The lung 42 would appear in a medically correct illustration. By use of various colors, a healthy lung is depicted and explained to the child or pediatric patient facing surgery.

After the healthy indicia 42 is explained, the first or disease-free overlay 40 is removed, and the second or diseased overlay 41 is applied in the position formerly occupied by the first overlay 40. The diseased lung or indicia 43 appearing on the second overlay 41 is then explained to the child to relieve his anxiety concerning his disease. The asthma overlay set consisting of first overlay 40 and second overlay 41 is believed to be particularly useful in the offices of asthma and allergy specialists.

It can be readily understood by those skilled in the art that many sets of overlays can be developed for explanation, training or anxiety-relieving purposes. The asthma overlays consist of only a first and second overlay (40, 41). It is obvious that any number of overlays may comprise a set for teaching or training purposes.

Once the advantage of having interchangeable sets of teaching overlays 30 was realized, it was also realized that easily removable organ representations or models 46, as shown in FIG. 6, could be used for more sophisticated training purposes. Organ model 46 is shown in the form of heart model 47, but it is readily apparent to one skilled in the art that any organ may be similarly provided for use on the training doll 21.

Regardless of which organ model 46 is provided, the construction will remain substantially the same. A first layer 50 of a suitable material is provided. A second layer 51, usually of a transparent vinyl, will have suitable indicia 31, in this case, a representation of a heart 47, provided in the manner similar to that shown in FIGS. 2 and 3, i.e. either as a drawing placed on the back of second layer 51, or as an indicia 31 sandwiched between first layer 50 and second layer 51. In many instances, it will be desired that the first layer 50 be of a white vinyl or other material to make the indicia 31 stand out sufficiently. A fastening means 52, which may be the same as the self-stick Velcro® fastener previously described, is attached to the back of second layer 51.

Organ model 46 may be manufactured with a medical implement accepting orifice or port 53 not heretofore known in the prior art. In the heart model 47 shown, port 53 takes the form of tube 54 sandwiched or laminated between first layer 50 and second layer 51.

Figure 8:
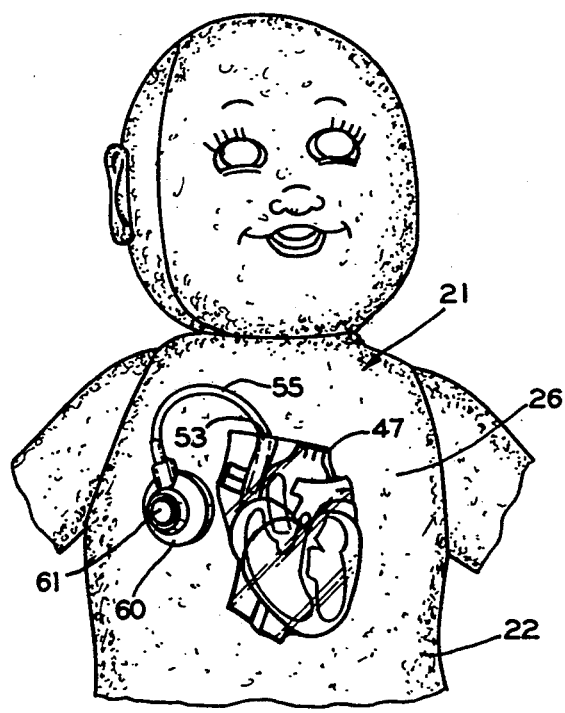
FIG. 8 is a perspective view, partially broken away, showing the organ model of FIG. 6, and an associated implanted port, in a construction embodying the present invention.

Referring to FIG. 8, the advantageous use of the present invention because of its organ-accepting nature may be seen. Attached to the torso 22 of the medical training doll 21 is the heart model 47 attached by fastening means 52 (not shown) to the fastener accepting fabric 26. A catheter 55 is inserted into implement accepting port 53 and is connected at its other end to implanted port 60. The implanted port 60 is attached to the torso 22 in substantially the location it would be found if it was under the skin in a human patient. The advantage of being able to show this to the patient before an implantation takes place is obvious. The implanted port 60, once positioned on the medical training doll 21, represents an injection site 61, which may now be used for training purposes. In order to simulate the implanted port 60 being beneath the skin of a patient, a transparent vest 64, which may have a first sheet and a second sheet (35, 36) of a suitable transparent material, is attached to the torso 22 over the assembly comprising the heart model 47, catheter 55 and implanted port 60. The medical implement accepting and/or injection site 61, although external to the training doll 21, is now underneath the vest overlay 64, and can be felt through the vest overlay by a nurse or other person in training, much like it would be felt under the skin of a patient.

Training concerning injection into the injection site 61 may now be given without risk of discoloring or ruining the fabric 26 of the doll 21. A small hole or injection opening, indicated by the numeral 67, will of necessity be made by the student injecting into the injection port 60. Because the vest overlay 64 is made of a suitable material unaffected by cleansing solutions, such as betadyne or alcohol, cleansing of the injection area over the injection port 60 may be shown to the nurse or other student before the injection takes place.

Similarly, post injection cleanup may be demonstrated without the risk of damage or discoloration to the training doll 21 or the vest 64.

A great variety of organ models 46 and vests 64 may be used and still be well within the scope of the present invention. In addition, the organ models 46 may be used without the vest 64 for training purposes when desired. An example of organ models 46 which may be used include the digestive system, ovaries, lungs, liver, pancreas, intestines, testicles, stomach and the like. When desired, the organ model 46 may be made with three dimensional indicia 31A, and second layer 51 may be a heat shrinkable film.

Additionally, because of the fastener accepting fabric 26, the training doll may be supplied with wigs to match the color or race of the patient. Different face appliques may be provided such as providing a sad face and a happy face, indicating the condition of the patient or child before and after surgery.

It can readily be seen from the foregoing description that an "injection" site can also be a "medical implement accepting" site, and vice versa. The term "injection" is used in the art to refer to a finite injection of medicine given in a short period of time such as a flu shot; vitamin shot, or the like. Injections are usually given by thin hypodermic needles, and devices such as implanted port 60, adapted to receive injections for training or teaching purposes usually are referred to as having "injection sites", such as injection site 61.

A longer term procedure, such as the giving of intravenous injections or chemotherapy treatments, usually requires the use of a tube or catheter, which is substantially larger than a hypodermic needle. These catheters, depending on the procedure being employed, may be threaded through an existing opening in the body, such as a urethra or nostril, or may involve the insertion of a tube or catheter into the body through a surgically made opening. Sites which accept catheters or tubes for these long term procedures are referred to as "medical implement accepting" sites. In some cases these long term procedures still use hypodermic needles, such as a long term intravenous feeding, and in such a case a "medical implement accepting" site will be an "injection" site.

For ease of understanding, in the balance of the present application, where a short term procedure is referred to, the term "injection site" will be used, and will refer to a site adapted to take a hypodermic needle, such as an implanted port 60 having an injection site 61. Where a medical implement accepting port designed to take a catheter is meant, the term "medical implement accepting" site will be used.

Figure 10:
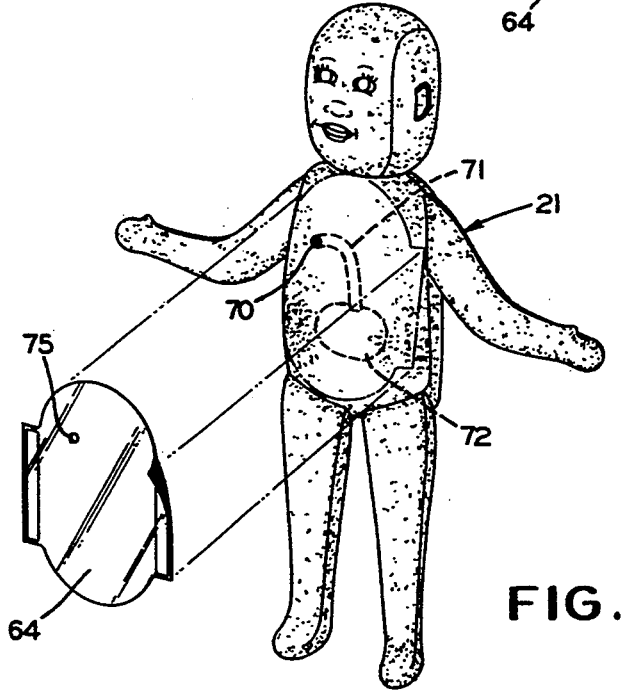
FIG. 10 is a perspective view showing the transparent vest overlay of FIG. 9 used in connection with an integral or internal injection site.

Referring to FIG. 10, there is shown what may be referred to as an internal or integral medical implement accepting site 70 for use in connection with the vest overlay 64. The internal implement accepting site or port 70 may be connected by a suitable conduit 71 to a reservoir 72 within the doll, so that actual fluids may be injected into or removed from the training doll 21. When the transparent vest 64 is used in connection with the internal implement accepting port 70, an implement accepting opening 75 will be provided in place of the injection opening 67.

For training purposes, the vest 64 is attached to the medical training doll 21 in the manner previously described, with implement accepting opening 75 in line with the internal port 70. Catheters or other medical devices may then be inserted through the implement accepting opening 75 into the port 70.

Figure 11:
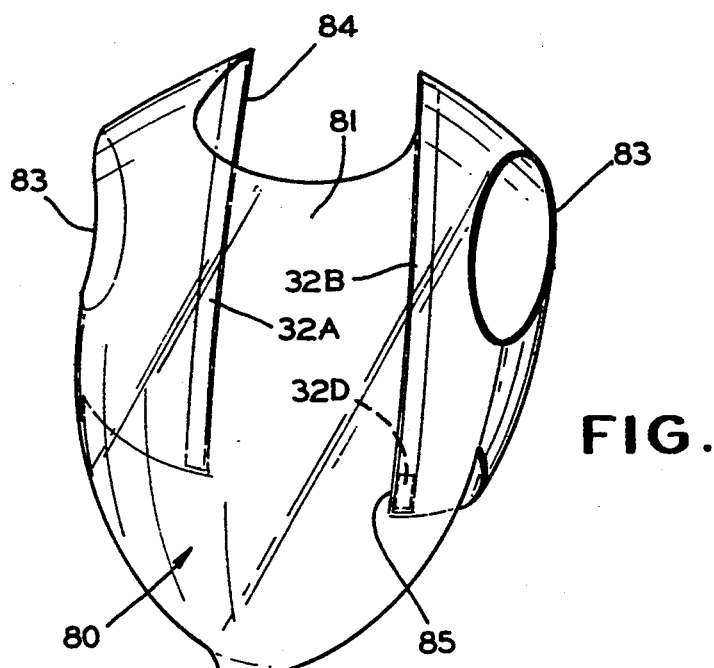
FIG. 11 is a perspective view showing a "full vest" which may be used with the medical training doll embodying the present invention.

Referring now to FIG. 11, an alternate embodiment of the transparent vest 64 is shown. For ease of understanding, this modification will be referred to as a closeable vest 80. The closeable vest 80 has a front or torso covering portion 81, and a crotch strap 82 having a female fastener portion 32C thereon. A pair of arm holes 83 are provided into which the arms 24 of the medical training doll are inserted. A first rear flap 84, having female fastener portion 32A, and a second rear flap 85, having male fastener portion 32B, are brought into an overlapping relationship and pressed together to close the vest 80. The crotch strap 82, having female fastener portion 32C, is then brought up between the legs 25 of the doll and pressed onto the male fastener portion 32D, thus securing the closeable vest 80 to the medical training doll 21.

Figure 12:
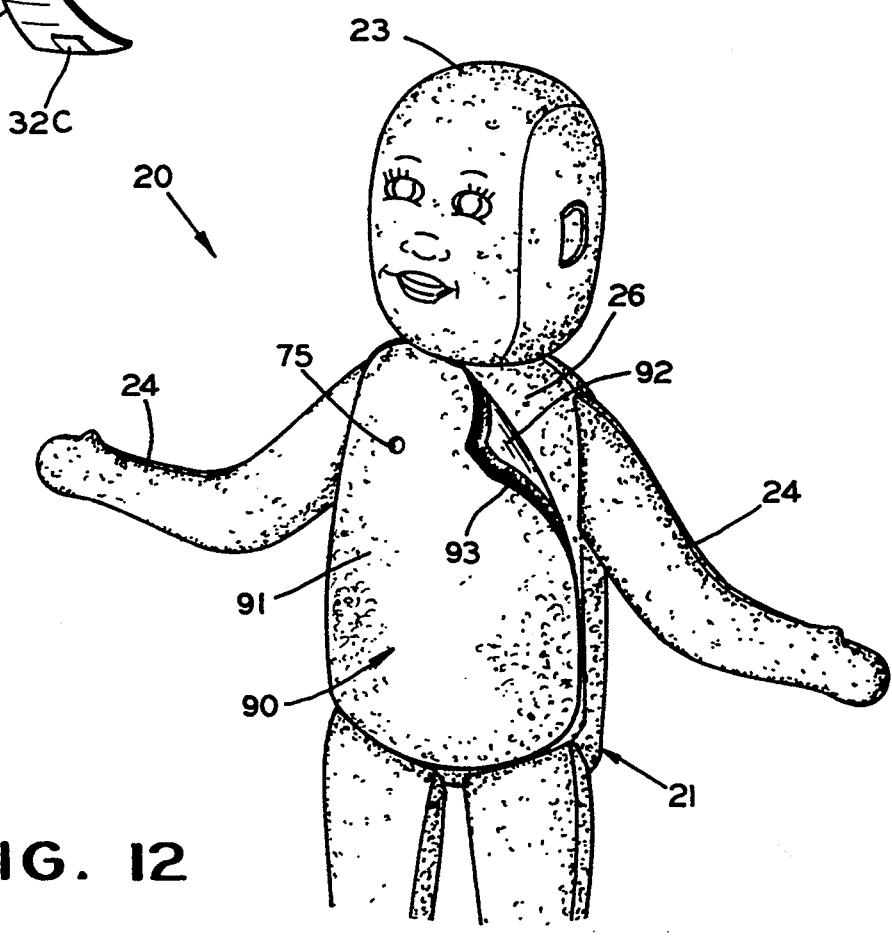
FIG. 12 is a perspective view, similar in part to FIG. 9, but showing a "second skin" attached to the medical training doll of the present invention in place of a transparent vest.

FIG. 12 shows a modification of the present invention wherein a "second skin" 90 is shown in conjunction with the medical training doll 21. Second skin 90 is of an opaque two-layer construction having a first fabric layer 91 which may be made of a material identical to the fastener accepting fabric 26 used on the medical training doll 21. The second fabric layer 92 may be of a smooth or "satin" type fabric which will not accept the fastener 32. This permits the second skin 90 to be positioned on the doll before the perimetrically extending male fastener 93, which may be of the same material as the fasteners 32, is pressed into engagement with the fastener accepting fabric 26, to fasten the second skin 90 to the medical training doll 21.

Figure 9:
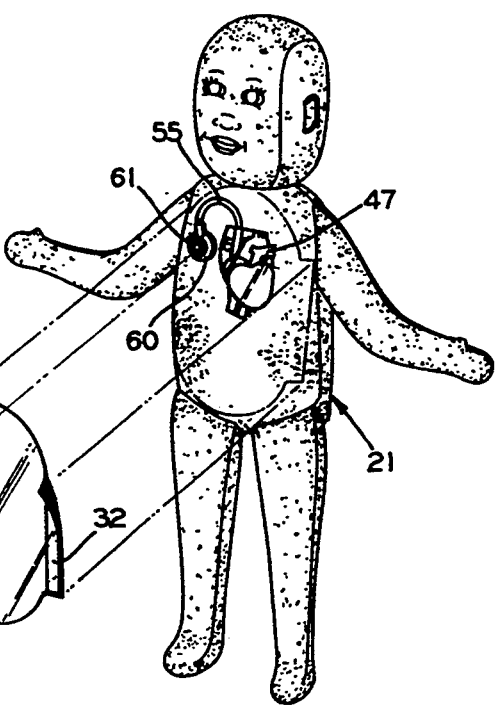
FIG. 9 is a perspective view showing a transparent vest overlay covering the organ model and associated implanted port shown in FIG. 8.

The second skin 90 is shown with an implement accepting opening 75. It can be understood by those skilled in the art that an injection opening 67 could also be supplied or made in the second skin 90. The second skin 90 is preferred for use when the medical training doll embodying the present invention is being used for relatively young pediatric patents. If, for example, an implanted port was being shown as illustrated in FIG. 9, the "peeling back" of the transparent vest 64 shown therein can be associated in the mind of a young child with the peeling back or tearing of the skin of that child. This can be very disturbing to the child. In this instance, it is more desirable to place the organ model 46, such as the heart model 47, on the medical training doll 21, and completely fasten down the second skin 90 to cover the organ model. The child will feel where the implanted port 60 will be placed. No chance is taken on disturbing the child by attaching and removing the transparent vest 64. With a young child it may even be desirable that no implement accepting opening 75 or injection site 67 be provided in the second skin 90.

Figure 13:
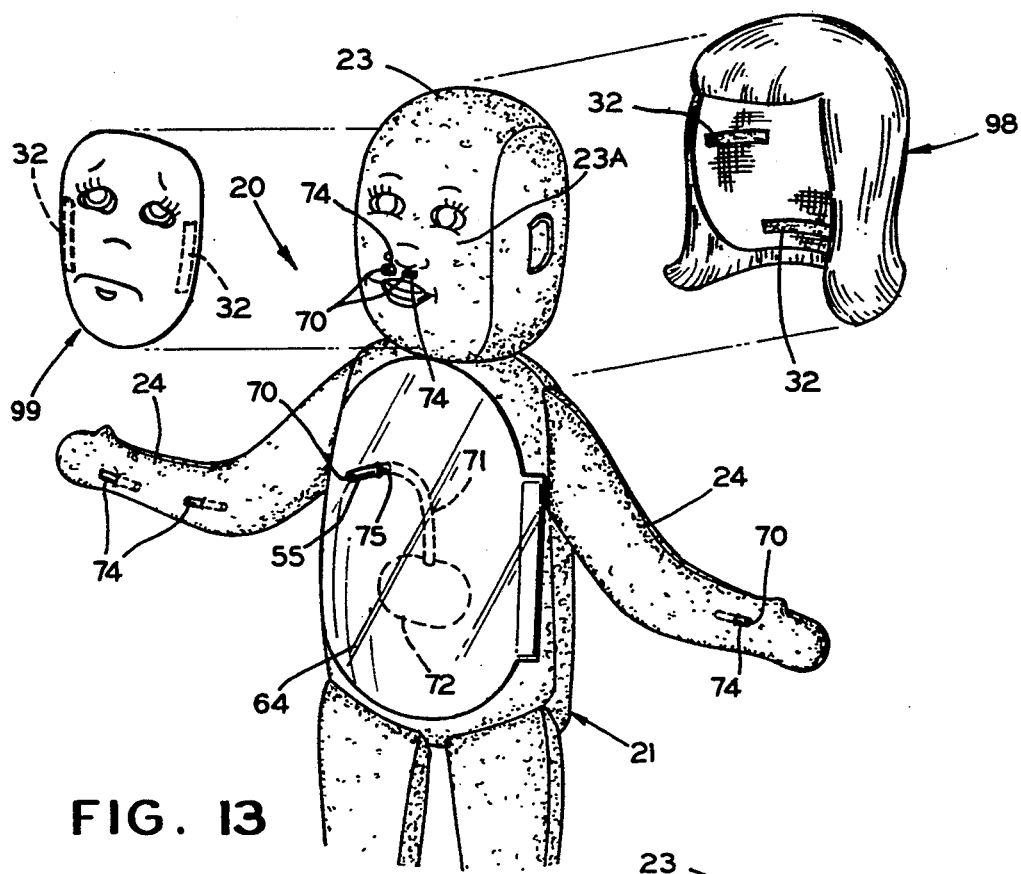
FIG. 13 is a perspective view of a modification of a construction embodying the present invention showing a transparent vest used in connection with a medical training doll having multiple medical accepting implement sites.

Referring to FIG. 13, another modification of the invention is shown. Like medical training doll 21 shown in FIG. 10, the doll 21 illustrated in FIG. 13 has the reservoir 72, internal tubing or conduit 71, and the transparent vest 64. The implement accepting opening 75 has been provided in registry with the internal port 70. The catheter 55 has been shown inserted therein.

This would be representative of many operations involving a medical implement accepting device. As illustrated, the medical training doll 21 may be provided with a plurality of integral or internal ports 70. The medical implement accepting tubes 74 provided at the implement accepting ports 70 may be of various sizes to accept the devices intended to be inserted therein.

Figure 14:
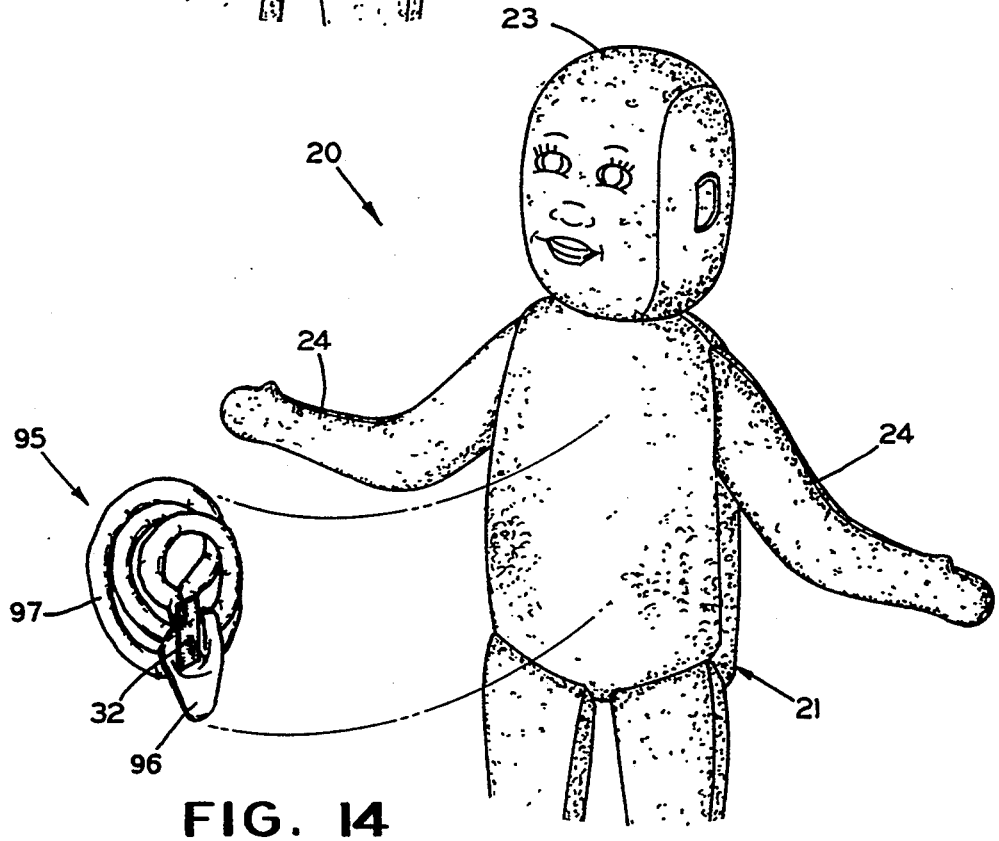
FIG. 14 is a perspective view of a medical training doll embodying the construction of the present invention and an organ model adapted to be fastened in place to the fastener accepting fabric thereof, for teaching purposes.

A further modification of the invention is shown in FIG. 14 wherein specialized organ models, such as birth defect model 95, are provided for teaching purposes. The birth defect model 95 in this illustration is representative of a birth defect known as gastroschisis. This is a condition in which the liver and intestines are outside the body of a newborn infant at birth. The liver is represented by the numeral 96, and the intestines by the numeral 97. If this birth defect, or other birth defects which can be represented by birth defect model 95, occur at a large hospital in urban areas there are sufficient trained personnel so the condition can be immediately tended to and hopefully not cause permanent damage to the infant.

If such a birth defect occurs in a small rural hospital, the effects can be disastrous if the personnel have not been given proper training. With a lower amount of births, rare birth defects are not encountered often. It is impractical and cost prohibitive to keep a staff trained in all types of birth defects on hand at all times. Also, it is cost prohibitive to send all the delivery nurses for training to large regional hospitals. Heretofore, this has been the only solution for obtaining the necessary training. Now, with our improved medical training dolls, training can be done on site.

It is anticipated that the regional teaching hospitals will equip a nurse with a medical training doll 21, and the desired birth defect models 95. The nurses training will be done on site at the community hospitals. In the particular case of gastroschisis, it is important that in training the birth defect model 95 be attached to the medical training doll 21 by the use of fastener 32. The intestines 97 will initially be in their distended position, instead of neatly coiled position 97. The training nurse can then manipulate the intestines to show how it is critical that they avoid being kinked. The proper procedure for treatment can then be demonstrated.

The scope of the present invention is broad. It is envisioned that any birth defect which can be represented by a birth defect model 95 is well within the scope of the present invention. Examples of birth defects which are known to be able to be represented by birth defect models 95 are such as gastroschisis and meningomyelocele. It is believed that many other birth defects may also be so represented.

When the medical training doll 21 embodying the present invention is being used with pediatric patents, it is sometimes helpful that the doll be made up to somewhat resemble the child in hair color, hair style and facial impressions. As illustrated in FIG. 13, the use of the fastener accepting fabric 26 on the face 23A and head 23 of the doll, in addition to the torso and other portions, is particularly advantageous in allowing a wig 98 to be fastened to the head of the doll by the fasteners 32. The wig may be of any desired color, and may be provided with any practical hair style.

Likewise, face mask 99 may be attached to the face 23A of the doll by fasteners 32. The face of the doll may be made in different colors to represent different races, and the facial expressions may be varied to represent different moods. For example, a sad face may be first put on the doll when the doll is being used to explain a child's disease. The diseased organs, such as the diseased lungs 43 shown in FIG. 4 are attached to the doll. After the diseased lung 43 is removed from the doll, and the healthy lung 42 is put on the doll, the face mask 99 with the sad expression may be removed and another face mask 99 with a happy expression may be attached.

Thus, by carefully studying the problems present in the art regarding the providing of a practical training aide, we have provided a novel and practical training doll for use in the medical profession, not only with children, but also with their parents, nurses, adult patients, and other medical professionals.

I claim:

1. A medical training aid including:
    a) a soft bodied portion,
    b) a fastener accepting fabric covering at least a portion of said soft bodied portion, and
    c) an overlay for attachment to said fastener accepting fabric, said overlay including:
        i) a first sheet,
        ii) a two or three dimensional object, and
        iii) a second sheet heat fused to the first sheet and having the two or three dimensional object interposed between the first sheet and the second sheet.

2. The training aid defined in claim 1, and including a plurality of implement accepting ports provided at predetermined positions on said training aid.

3. The medical training aid defined in claim 1, and including a birth defect model attachable to said fastener accepting fabric.

4. The medical training aid defined in claim 1, and including:
    a) a head portion at least partially covered with a fastener accepting fabric, and
    b) a wig having fasteners and removably attachable to the head portion of the medical training aid.

5. The medical training aid defined in claim 4, and including a face mask attachable to the head of said medical training aid.

6. A medical training aid including:
    a) a soft bodied torso portion for accepting overlays,
    b) a fastener accepting fabric covering at least part of said soft bodied portion, and
    c) a set of asthma overlays for attachment to said soft bodied portion of the medical training aid, said set of asthma overlays including a first overlay depicting a healthy lung, and a second overlay depicting a diseased lung.

7. The training aid defined in claim 6, wherein said first and said second overlay each comprise:
    a) a first sheet of material,
    b) indicia on one side of said first sheet of material, and
    c) a second sheet of material placed over said indicia and heat-fused to said first sheet of material.

8. The training aid defined in claim 6, wherein said first and second overly each comprise:
    a) a first sheet of material,
    b) a two or three dimensional indicia, and
    c) a second sheet of material placed over said two or three dimensional indicia and heat fused to said first sheet of material.

9. The device defined in claim 8, wherein said first sheet of material is a transparent vinyl polymer material, and said second sheet of material is a heat shrinkable film.

10. A medical training aid including:
    a) a soft bodied portion for accepting medical training aids,
    b) a fastener accepting fabric covering at least a part of said soft bodied portion,
    c) an organ model for attachment to said soft bodied portion, and
    d) a vest overlay for attachment to said soft bodied-portion over said organ model.

11. The training aid defined in claim 10, wherein said organ model includes an implement accepting port.

12. The training aid defined in claim 10, wherein said organ model includes:
    a) a first layer,
    b) a second layer heat-fused to said first layer, and
    c) an implement accepting port including a tube interposed between said first layer and said second layer to receive a catheter.

13. The training aid defined in claim 12, wherein said organ model is a heart model, and further includes:
    a) a catheter inserted into the tube in a heart model, and
    b) an implanted port connected to said catheter.

14. The medical training aid defined in claim 10, and including a plurality of implementing accepting ports provided at predetermined positions on said training aid.

15. The training aid defined in claim 10, and including a birth defect model attachable to said fastener accepting fabric.

16. The medical training aid defined in claim 10 including:
    (a) a head at least partially covered with a fastener accepting fabric, and
    (b) a wig having fasteners and removably attachable to the head of the medical training aid.

17. The medical training aid defined in claim 16, and including a face mask having fasteners and attachable to the head of said medical training aid.

18. A medical training aid including:
    a) a soft bodied portion,
    b) a fastener accepting fabric covering at least a part of said soft bodied portion, and
    c) an internal injection site provided in said soft bodied portion, said internal injection site is in fluid communication with a conduit positioned internally of said soft bodied portion.

19. The training aid defined in claim 18, wherein a reservoir is in fluid communication with said conduit.

20. The training aid defined in claim 18, and including a birth defect model attachable to said fastener accepting fabric.

21. An organ model for use as a medical training aid, including:
    a) a first layer;
    b) a second layer of a heat shrinkable film secured to said first layer, and
    c) an implement accepting port including a tube interposed between said first layer and said second layer to receive a catheter.

22. The model defined in claim 21, wherein said first layer is of a white vinyl polymer composition.

23. A medical training doll including:
    a) a soft bodied portion,
    b) a fastener accepting fabric covering at least a part of said soft bodied portion and
    c) a birth defect model of a liver and intestines attachable to said fastener accepting fabric.

* * * * *